United States Patent
Spencer et al.

(10) Patent No.: US 9,145,465 B2
(45) Date of Patent: Sep. 29, 2015

(54) LOW DOSAGE KINETIC HYDRATE INHIBITORS FOR NATURAL GAS PRODUCTION SYSTEMS

(71) Applicants: Howard James Spencer, Liverpool (GB); Ravinder Virdee, Liverpool (GB); Michael P. Squicciarini, Richmond, TX (US); Gordon T. Rivers, Houston, TX (US); Marc N. Lehmann, Houston, TX (US)

(72) Inventors: Howard James Spencer, Liverpool (GB); Ravinder Virdee, Liverpool (GB); Michael P. Squicciarini, Richmond, TX (US); Gordon T. Rivers, Houston, TX (US); Marc N. Lehmann, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 458 days.

(21) Appl. No.: 13/648,491
(22) Filed: Oct. 10, 2012
(65) Prior Publication Data US 2013/0098623 A1 Apr. 25, 2013

Related U.S. Application Data

(60) Provisional application No. 61/549,576, filed on Oct. 20, 2011.

(51) Int. Cl.
| | |
|---|---|
| E21B 21/00 | (2006.01) |
| E21B 43/00 | (2006.01) |
| C09K 8/588 | (2006.01) |
| C09K 8/60 | (2006.01) |
| C08F 220/34 | (2006.01) |
| C08F 226/06 | (2006.01) |
| C09K 8/52 | (2006.01) |

(52) U.S. Cl.
CPC ............ *C08F 220/34* (2013.01); *C08F 226/06* (2013.01); *C09K 8/52* (2013.01); *C09K 2208/22* (2013.01)

(58) Field of Classification Search
USPC .......................... 166/310, 243; 507/221, 242
See application file for complete search history.

(56) References Cited

U.S. PATENT DOCUMENTS

| | | | |
|---|---|---|---|
| 4,915,176 A | 4/1990 | Sugier et al. | |
| 5,432,292 A | 7/1995 | Sloan, Jr. | |
| 5,583,273 A | 12/1996 | Colle et al. | |

(Continued)

FOREIGN PATENT DOCUMENTS

EP        0323774 A1      7/1989

OTHER PUBLICATIONS

Froehling, Peter et al., "Properties and applications of poly(propylene imine) dendrimers and poly(esteramide) hyperbranched polymers," Macromolecular symposia, vol. 151 pp. 581-589 (2000).

(Continued)

*Primary Examiner* — Susannah Chung
*Assistant Examiner* — Atnaf Admasu
(74) *Attorney, Agent, or Firm* — Mossman Kumar & Tyler PC

(57) ABSTRACT

Copolymers containing acryloylmorpholine and vinylimidazole, and optionally vinylcaprolactam and/or n-vinyl pyrrolidone, have shown superior results in hydrate inhibition tests at conditions of 7° C. subcooling dosed at 1 vol % based on the water cut of the system fluids. The copolymer product has also passed high TDS (total dissolved solids) brine compatibility tests and secondary property tests including foaming and hot injection tests which make it useful as a kinetic hydrate inhibitor in gas production systems susceptible to the formation of natural gas hydrates.

7 Claims, 1 Drawing Sheet

(56) References Cited

U.S. PATENT DOCUMENTS

| | | |
|---|---|---|
| 5,600,044 A | 2/1997 | Colle et al. |
| 6,117,929 A | 9/2000 | Bakeev et al. |
| 6,905,605 B2 | 6/2005 | Klomp |
| 2004/0024152 A1* | 2/2004 | Toyama et al. .............. 526/227 |
| 2006/0094913 A1 | 5/2006 | Spratt |
| 2008/0248427 A1 | 10/2008 | Thiyagarajan et al. |
| 2010/0183851 A1 | 7/2010 | Cao et al. |
| 2011/0240915 A1 | 10/2011 | Tian et al. |

OTHER PUBLICATIONS

Van Benthem, Rolf T.M. et al., "Synthesis and Characterization of Bis(2-hydroxypropyl)amide-Based Hyperbrached Polyesteramides," Macromolecules 34, pp. 3559-3566 (2001).

Froehling, Peter, "Development of DSM's Hybrane® Hyperbranched Polyesteramides," Jnl of Polymer Science: Part A: Polymer Chemistry, vol. 42, pp. 3110-3115 (2004).

\* cited by examiner

US 9,145,465 B2

LOW DOSAGE KINETIC HYDRATE INHIBITORS FOR NATURAL GAS PRODUCTION SYSTEMS

CROSS-REFERENCE TO RELATED APPLICATION

This application claims the benefit of U.S. Provisional Patent Application Ser. No. 61/549,576 filed Oct. 20, 2011, incorporated herein by reference in its entirety.

TECHNICAL FIELD

The invention relates to methods and compositions for inhibiting the formation of hydrocarbon hydrates, and most particularly relates, in one non-limiting embodiment, to methods and compositions for inhibiting the formation of hydrocarbon hydrates during the production of oil and gas using polymeric kinetic hydrate inhibitors (KHIs).

BACKGROUND

A number of hydrocarbons, especially lower-boiling light hydrocarbons, in formation fluids or natural gas are known to form hydrates in conjunction with the water present in the system under a variety of conditions—particularly at a combination of low temperature and high pressure (pressure and temperature are system-specific for the formation of gas hydrates). The hydrates usually exist in solid forms that are essentially insoluble in the fluid itself. As a result, any solids in a formation or natural gas fluid are at least a nuisance for production, handling and transport of these fluids. It is not uncommon for hydrate solids (or crystals) to cause plugging and/or blockage of pipelines or transfer lines or other conduits, valves and/or safety devices and/or other equipment, resulting in shutdown, loss of production and risk of explosion or unintended release of hydrocarbons into the environment either on-land or off-shore. Accordingly, hydrocarbon hydrates have been of substantial interest as well as concern to many industries, particularly the petroleum and natural gas industries.

Hydrocarbon hydrates are clathrates, and are also referred to as inclusion compounds. Clathrates are cage structures formed between a host molecule and a guest molecule. A hydrocarbon hydrate generally is composed of crystals formed by water host molecules surrounding the hydrocarbon guest molecules. The smaller or lower-boiling hydrocarbon molecules, particularly $C_1$ (methane) to $C_4$ hydrocarbons and their mixtures, are more problematic because it is believed that their hydrate or clathrate crystals are easier to form. For instance, it is possible for ethane to form hydrates at as high as 4° C. at a pressure of about 1 MPa. If the pressure is about 3 MPa, ethane hydrates can form at as high a temperature as 14° C. Even certain non-hydrocarbons such as carbon dioxide, nitrogen and hydrogen sulfide are known to form hydrates under the proper conditions.

There are two broad techniques used to overcome or control the hydrocarbon hydrate problems, namely the use of thermodynamic inhibitors and Low Dosage Hydrate Inhibitors (LDHIs). LDHIs are referred to as such due to the low volume required to treat production streams when compared to thermodynamic inhibitors. For the thermodynamic approach, there are a number of reported or attempted methods, including water removal, increasing temperature, decreasing pressure, addition of "antifreeze" to the fluid and/or a combination of these. The LDHI approach is further split into two areas, Anti-Agglomerants (AAs) and kinetic hydrate inhibitors (KHIs). AAs prevent smaller hydrocarbon hydrate crystals from agglomerating into larger ones and allow a mass of hydrates, sometimes referred to as a hydrate slurry, to be transported along the conduit. KHIs however inhibit, retard and/or prevent initial hydrocarbon hydrate crystal nucleation; and/or crystal growth. Thermodynamic and kinetic hydrate control methods may be used in conjunction.

Kinetic efforts to control hydrates have included the use of different materials as inhibitors. For instance, onium compounds with at least four carbon substituents are used to inhibit the plugging of conduits by gas hydrates. Additives such as polymers with lactam rings have also been employed to control clathrate hydrates in fluid systems. LDHIs are relatively expensive materials, and it is always advantageous to determine ways of lowering the usage levels of these hydrate inhibitors while maintaining effective hydrate inhibition.

Thus, it is desirable if new gas hydrate inhibitors were discovered which would yield comparable or improved results over known gas hydrate inhibitors, and it is also desirable to find new, unexpected applications for gas hydrate inhibitors.

SUMMARY

There is provided, in one form, a method for inhibiting the formation of hydrates that involves contacting a fluid that includes water and hydrate-forming guest molecules that form hydrates at hydrate forming conditions, with an amount of a kinetic hydrate inhibitor (KHI). The KHI includes a copolymer or terpolymer made using monomers such as acryloylmorpholine, vinylimidazole, and/or vinylcaprolactam. The amount of KHI is that effective to inhibit hydrate formation at the hydrate forming conditions.

In another non-limiting embodiment herein, there is provided a hydrate-inhibited fluid that includes, water, hydrate-forming guest molecules, and at least one KHI in an amount effective to inhibit formation of hydrates at hydrate forming conditions. Again, the KHI includes a copolymer or terpolymer made using monomers such as acryloylmorpholine, vinylimidazole, and/or vinylcaprolactam.

In an alternate, non-restrictive version there is provided a copolymer formed by free radical polymerization from monomers including acryloylmorpholine, vinylimidazole, and/or vinylcaprolactam.

Further in a different, non-limiting embodiment there is provided a hydrocarbon well having an annular space including fluid in the annular space where the fluid is inhibited against hydrate formation in the presence of water at hydrate forming conditions. The fluid comprises water, hydrate-forming guest molecules, and at least one KHI in an amount effective to inhibit formation of hydrates at hydrate forming conditions. The KHI again includes a copolymer made from monomers including acryloylmorpholine, vinylimidazole, and/or vinylcaprolactam.

DETAILED DESCRIPTION

Figure 1:
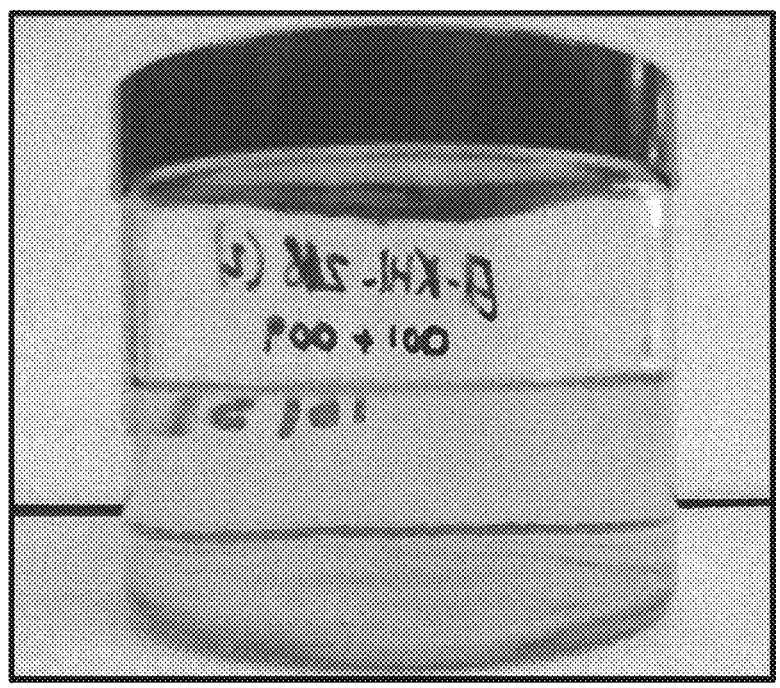
FIG. 1 is a photograph of a jar containing an intermediate copolymer of acryloylmorpholine and vinylimidazole as synthesized.

Methods and compositions have been discovered for inhibiting, retarding, mitigating, reducing, controlling and/or delaying formation of hydrocarbon hydrates or agglomerates of hydrates in fluids used in hydrocarbon recovery operations. The method may be applied to prevent or reduce or mitigate plugging of annular spaces, pipes, transfer lines, valves, and other places or equipment downhole where hydrocarbon hydrate solids may form under conditions conducive to their formation or agglomeration.

The term "inhibiting" is used herein in a broad and general sense to mean any improvement in preventing, controlling, delaying, reducing or mitigating the formation, growth and/or agglomeration of hydrocarbon hydrates, particularly light hydrocarbon gas hydrates in any manner, including, but not limited to kinetically, thermodynamically, by dissolution, by breaking up, by anti-agglomeration other mechanisms, or any combination thereof. Although the term "inhibiting" is not intended to be restricted to the complete cessation of gas hydrate formation, it may include the possibility that formation of any gas hydrate is entirely prevented.

The terms "formation" or "forming" relating to hydrates are used herein in a broad and general manner to include, but are not limited to, any formation of hydrate solids from water and hydrocarbon(s) or hydrocarbon and non-hydrocarbon gas(es) known to form hydrates, growth of hydrate solids, agglomeration of hydrates, accumulation of hydrates on surfaces, any deterioration of hydrate solids plugging or other problems in a system and combinations thereof.

The term "low dosage" used with respect to low dosage hydrate inhibitors (LDHIs) as defined herein refers to volumes of less than 15 volume % (vol %) of the water (water cut or water content) in the fluids being treated; alternatively less than 5 vol %. In some non-limiting embodiments, the vol % for thermodynamic hydrate inhibitors may be considerably higher, which depends on both the system subcooling and hold or residence time.

The present method is useful for inhibiting hydrate formation for many hydrocarbons particularly including hydrocarbon and non-hydrocarbon mixtures. The method is particularly useful for lighter or low-boiling, $C_1$-$C_5$, hydrocarbon gases, non-hydrocarbon gases or gas mixtures at ambient conditions. Examples of such gases include, but are not necessarily limited to, methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, xenon, and mixtures thereof. These molecules are also termed hydrate-forming guest molecules herein. Other examples include various natural gas mixtures that are present in many gas and/or oil formations and natural gas liquids (NGL). The hydrates of all of these low-boiling hydrocarbons are also referred to as gas hydrates. The hydrocarbons may also comprise other compounds including, but not limited to CO, $CO_2$, COS, hydrogen, hydrogen sulfide ($H_2S$), and other compounds commonly found in gas/oil formations or processing plants, either naturally occurring or used in recovering/processing hydrocarbons from the formation or both, and mixtures thereof.

The fluids treated may include, but are not necessarily limited to, drilling fluids, drill-in fluids, completion fluids, production fluids. In one non-limiting embodiment the fluids may be brines (e.g. chlorides, bromides, formates and the like). Suitable salts for forming the brines include, but are not necessarily limited to, sodium chloride, calcium chloride, zinc chloride, potassium chloride, potassium bromide, sodium bromide, calcium bromide, zinc bromide, sodium formate, potassium formate, ammonium formate, cesium formate, and mixtures thereof. The fluids may be placed in the annular space or other spaces downhole to facilitate the production of hydrocarbons from the well. The method of inhibiting hydrates is expected to be applicable where a fluid is present in a wellbore, a pipeline, an umbilical, a pipe, a transfer line, a valve, a slug catcher and combinations thereof.

Suitable gas hydrate inhibitors for use in the methods and fluid compositions herein may include, but are not necessarily limited to, copolymers and/or terpolymers of at least two different monomers, in particular two or more of the group including acryloylmorpholine, vinylimidazole, vinylcaprolactam and/or n-vinyl pyrrolidone. In particular, it has been discovered that the copolymer of acryloylmorpholine and vinylimidazole, as well as the terpolymer of acryloylmorpholine, vinylimidazole and vinylcaprolactam, and combinations thereof, are particularly useful.

The monomers are unsaturated and may be polymerized by free radical polymerization using any suitable free radical polymerization initiators. Such initiators include, but are not necessarily limited to, VAZO® 56 WSW initiator available from DuPont, VAZO® 68 WSP and other VAZO® initiators, ammonium persulfate, di-tert butyl peroxide, other azo compounds and peroxides. The polymerization proceeds easily, at a temperature between about 55 and about 75° C. at ambient pressure. Suitable chain transfer agents, modifiers or regulators include, but are not necessarily limited to, 2-propanol (isopropanol; IPA), 1-octanethiol, and the like. In the case of the copolymer of acryloylmorpholine and vinylimidazole, the molar ratio of acryloylmorpholine to vinylimidazole ranges from about 1:99 to about 99:1; alternatively in a ratio of about 1:1. In the case of the terpolymer of acryloylmorpholine, vinylimidazole and vinylcaprolactam, the molar ratio of acryloylmorpholine to vinylimidazole to vinylcaprolactam ranges from about 1:1:98 to about 1:98:1 to about 98:1:1. Alternatively, the molar ratio of the monomers in the terpolymer may range from those in the previous sentence to 33.3:33.3:33.3, in another non-limiting embodiment to 40:20:40 and in a different, non-restrictive version to 45:10:45.

With more specificity and in one non-limiting embodiment the product may be synthesized by a free radical polymerization mechanism. Methanol may be used as the reaction solvent (although other similar solvents are expected to be useful) and VAZO 56 WSW supplied by Du Pont may be used as the free radical initiator. A 1:1 molar mixture of acryloylmorpholine and vinylimidazole may be charged to a reaction pot containing methanol and deoxygenated for 15 minutes by sparging with nitrogen. The free radical initiator may be dissolved in methanol and also deoxygenated. The reaction pot may be heated to 65° C. and the initiator added to the monomer mixture over ten minutes maintaining the system under nitrogen. On completion of the addition the reaction may be left to stir at 65-67° C. for an hour after which time a viscosity increase may be observed. A further viscosity increase may be observed as the mixture is allowed to cool. The appearance of the mixture may be a pale yellow clear liquid, such as shown in FIG. 1. The weight percent of the active component in the final product is approximately 25%. As will be discussed, hydrate inhibition tests on such a copolymer product were carried out using stainless steel T-piece rocking cells without a viewing window and pressures monitored by the use of electronic pressure transducers. A condensate (from the Ten Arlo field):water mix (75:25) was used as the system fluid. All tests were done at 7° C. subcooling varying the dose rate of the product between 1-3 vol %. A Qatar Gas 3/4 synthetic gas mixture was used with a 48 hour rocking test period. The product gave 3/3 passes at a 3 vol % dosage and 2/3 passes at a 1 vol % dosage. Improved performances in secondary property and compatibility tests distinguish this product from the results obtained from known, commercial products. The new polymer is compatible in high salinity brines at room temperature and at temperatures as high as 75° C. Alternative, existing products showed poor performances in these tests.

The contacting of the gas hydrate inhibitors herein with the mixture of hydrocarbon, water and hydrate-forming guest molecules may be achieved by a number of ways or techniques, including, but not necessarily limited to, mixing, blending with mechanical mixing equipment or devices, static mixers, magnetic mixing or other suitable methods, other equipment and means known to one skilled in the art and combinations thereof to provide adequate contact and/or dispersion of the composition in the mixture. The contacting can be made in-line or offline or both. The various components of the composition may be mixed prior to or during contact, or both. If needed or desired, the composition or some of its components may be optionally removed or separated mechanically, chemically, or by other methods known to one skilled in the art, or by a combination of these methods after the hydrate formation conditions are no longer present.

Because the present compositions and methods are particularly suitable for lower boiling hydrocarbons or hydrocarbon and/or non-hydrocarbon gases at ambient conditions with no more than five carbon atoms, the pressure of the hydrate-forming condition is usually at or greater than atmospheric pressure (i.e. greater than or equal to about 101 kPa), alternatively greater than about 1 MPa, and in another non-limiting embodiment greater than about 5 MPa. The pressure in certain formations or processing plants or units could be much higher, say greater than about 20 MPa. There is no specific high pressure limit. The present method can be used at any pressure that allows formation of hydrocarbon gas hydrates.

The temperature of the condition for contacting is usually below, the same as, or not much higher than, the ambient or room temperature. Lower temperatures tend to favor hydrate formation, thus requiring the treatment with the compositions described herein. At much higher temperatures, however, hydrocarbon hydrates may not form, thus obviating the need of carrying out any treatments.

It will be appreciated that it may be difficult to predict in advance the proportions of gas hydrate inhibitors herein effective in inhibiting hydrocarbon hydrate formations in fluids any given situation. There are a number of complex, interrelated factors that must be taken into account in determining the effective dosage or proportion, including, but not necessarily limited to, the proportion of water in the fluid, the nature of the hydrocarbon, the nature of the hydrate-forming guest molecules, the temperature and pressure conditions that the mixture of hydrocarbon and water are subject to, the particular hydrocarbon hydrate inhibitor employed, etc. Experimentation with a particular set of conditions or in a specific system may be a suitable way to determine the optimum dosage range. Care should be taken to avoid the formation of problematic quantities of irreversible, harmful hydrate masses. Nevertheless, in the interest of attempting to provide some general guidance of effective proportions, relative to the water phase, the amount of the KHI is from about 1 vol % independently to about 15 vol %, alternatively 8 volume % or less, and in another non-limiting embodiment ranges from about 1 independently to about 5 vol %, and in one non-limiting embodiment is less than 2 vol %. In one non-limiting embodiment the lower limit is independently about 0.01 volume %, and alternatively is about 0.1 vol % and possibly is about 0.5 vol %. The term "independently" as used herein with respect to a range means that any lower threshold may be combined with any upper threshold to give a suitable alternate range.

In addition to the gas hydrate inhibitor herein, the hydrocarbon, inhibitor composition and the fluid may further comprise other additional components, including, but not limited to, different controlling or inhibiting chemistries such as corrosion inhibitors, wax inhibitors, scale inhibitors, asphaltene inhibitors and other gas hydrate inhibitors and/or solvents. Suitable solvents for the gas hydrate inhibitors herein may include, but are not limited to water; at least one oxygenated compound selected from $C_1$-$C_6$ alcohols, $C_2$-$C_6$ glycols, $C_1$-$C_6$ mono-aliphatic, alternatively mono-alkyl, ethers of $C_2$-$C_6$ glycol, glycerin, $C_1$-$C_6$ mono-aliphatic, particularly mono-alkyl, ethers of glycerin, $C_1$-$C_6$ di-aliphatic, particularly dialkyl, ethers of glycerin, glycerin esters of $C_1$-$C_6$ carboxylate; tetrahydrofuran; N-methylpyrrolidone; sulfolane; $C_3$-$C_{10}$ ketones, and mixtures thereof. Examples of acceptable solvents in one non-limiting embodiment include water and liquid oxygenated materials such as methanol, ethanol, propanol, glycols like ethylene glycol, 1,2-propylene glycol, 1,3-propylene glycol, glycerin, esters and ethers of glycerin, CELLOSOLVE® (2-ethoxyethanol), CELLOSOLVE derivatives, 2-propoxyethanol, 2-isopropoxyethanol, 2-butoxyethanol, 2-isobutoxyethanol, 2-methoxyethanol, ethoxylated propylene glycols, ketones such as cyclohexanone and diisobutylketone, and mixtures thereof. The solvent is present in the total hydrocarbon hydrate inhibiting composition in the range of from 0 wt % independently to about 85 wt %, alternatively from about 0 wt % independently to about 65 wt %, of the total composition, based on volume. CELLOSOLVE is a registered trademark of Union Carbide Corporation.

The polymers described herein also may be used in combination with other methods or processes, which have been known to one skilled in the art as discussed in the Background to help inhibit formation of hydrates, as well as other known hydrate inhibitors including, but not necessarily limited to, onium compounds and dendrimeric compounds and in particular hyperbranched polyester amides.

The invention will now be described with reference to particular Examples which are not intended to limit the invention but rather simply to illuminate it further.

EXAMPLES

The synthetic gas mixture used in testing had the composition as shown in Table I.

TABLE I

| Synthetic Gas Mixture | |
| --- | --- |
| Proportion | Component |
| 1.0 | n-Butane |
| 0.8 vol % | Isobutene |
| 1.8 vol % | Carbon Dioxide |
| 3.6 vol % | Propane |
| 5.2 vol % | Ethane |
| 87.6 vol % | Methane |

Example 1

Copolymer of Acryloylmorpholine and Vinylimidazole

Introduction

KHI A is a copolymer made up from two monomers: 4-acryloylmorpholine and 1-vinylimidazole. The polymer has shown very encouraging performances in hydrate inhibition tests and has also passed a series of compatibility and secondary property tests.

Preparation

KHI B was synthesized by a free radical polymerization mechanism. The procedure is quick and involves very few steps. Table II lists the reagents in the reaction and quantities used. It is also worth noting that a large quantity of 2-propanol (IPA) used dramatically decreases the sample viscosity.

TABLE II

Reagents for KHI B

| Reagent | Supplier | Purity | Mol. Wt. | Quantity ml | Quantity g | Moles | Ratio | Density | B. pt. |
|---|---|---|---|---|---|---|---|---|---|
| 4-Acryloyl-morpholine | Aldrich | 97% | 141.17 | 10.8 | 12.1 | 0.085 | 50 | 1.122 | 158° C. (50 mm Hg) |
| Vinylimid-azole | Aldrich | >99% | 94.12 | 7.7 | 8.0 | 0.0855 | 50 | 1.039 | 192-194° C. |
| Methanol (pot) | Fisher | Tech. | 32.04 | 60 | 47.4 | 1.479 | — | 0.791 | 65° C. |
| Methanol (VAZO 56) | Fisher | Tech. | 32.04 | 40 | 31.6 | 0.986 | — | 0.791 | 65° C. |
| VAZO 56 initiator | DuPont | — | 271.34 | | 0.645 | 2.38 mmol | 1 | 0.38 | — |
| water | — | Deionized | 18.02 | 20 | 20 | 1.110 | — | 1 | 100° C. |

Procedure

Acryloylmorpholine (12.1 g), vinylimidazole (8.0 g), and methanol (60 g) were charged to a 500 ml reaction pot and degassed with nitrogen for 10 minutes. The VAZO 56 WSW initiator (0.645 g) was dissolved in methanol (31.6 g) in a pressure equalising funnel and also degassed for 10 minutes. The solution of monomers was heated to a temperature between 65-67° C. and the initiator solution was added to the heated monomer solution as a single addition. The reaction was left to stir at 65-67° C. under nitrogen for an hour. The heat was removed and the polymer allowed to cool with stirring.

Hydrate Test Results

Hydrate tests were carried out using T-piece rocking cells. All test work was done at 7° C. subcooling using Ten Arlo condensate. The test conditions in Table III were used.

TABLE III

Hydrate Test Conditions

| | |
|---|---|
| Condensate: | Ten Arlo condensate (70%) |
| Aqueous phase | DI Water (30%) |
| Gas | synthetic mixture |
| Fill pressure | 112 bar (11.2 MPa) |
| Sub-cooling | 7° C. |
| Motion | rocking-static-rocking |
| Duration | 168 hours |

Figure 2:
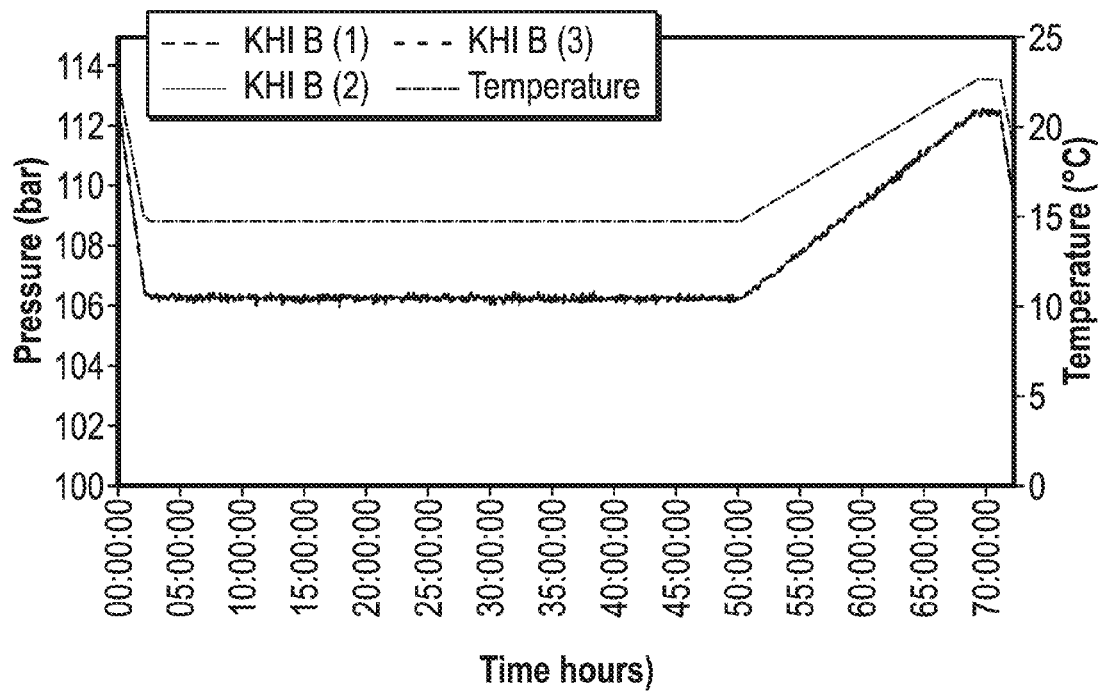
FIG. 2 is a plot of pressure as a function of time for a 3 vol % dosage of KHI B copolymer for 3 of 3 passes at 7° C. subcooling demonstrating consistent hydrate inhibition until at least about 50 hours.

The polymer was run in duplicate to verify performance and reproducibility. The results given in FIG. 2 show the KHI B gave inhibition at 7° C. subcooling at 1.5 vol % dosage for up to 150 hours.

In addition to performing well in hydrate inhibition tests, the product must undergo a series of secondary property and compatibility tests in order to be considered further as a commercial product. These include a hot injection test, a foaming tendency test and an emulsion tendency test.

Example 2

Hot Injection Test

This test determines how stable the polymer is at injection point temperature (whatever the injection temperature is at the specified gas field). A Duran bottle containing the water/condensate mixture was heated to 90° C. using a temperature controlled stirrer hotplate. Once at 90° C., the KHI was injected at the appropriate dose based on the water cut. The solution is left at 90° C. for 1 hour then allowed to cool back below 30° C. Observations were taken throughout the test. Results are reported in Table IV.

TABLE IV

Hot Injection Test Results

| Polymer reference | Appearance at 90° C. before injection | Appearance immediately after injection | Appearance after 1 hr at 90° C. | Any notable appearance changes on cooling back to <30° C. | Pass/Fail |
|---|---|---|---|---|---|
| KHI B | Clear, condensation bubbles around the flask | Fluids remain the same, no emulsion or precipitate | Slight cloudiness in the bottom water layer due to the polymer. | No changes on cooling | Pass |

Example 3

Foaming Tendency Test

In a 1 liter graduated cylinder with an internal diameter of 60 mm, a mixture of 100 ml Ten Arlo condensate and 100 ml DI water is dosed with 1.5 vol % KHI (based on water cut) and purged for two minutes with a 2.8 liter/min $N_2$ flow through a sintered P2 glass tube. Both the initial foam height and the time taken for the foam to collapse were recorded. The test temperature was ambient. A foam height of more than 500 ml or a time greater than one minute for the collapse is unsatisfactory and disqualifies the KHI. The passing results are shown in TABLE V.

TABLE V

Foaming Tendency Test Results

| Product | Dose (vol %) | Foam Volume (mls) | Time for Foam Collapse (sec) |
|---|---|---|---|
| KHI B | 1.5 | <500 | 19 |

Example 4

Emulsion Tendency Test

A 70:30 Condensate/DI water mixture dosed with 1.5 vol % hydrate inhibitor (based on water) was agitated using an ULTRA TURRAX® disperser at 5000 rpm for 3 minutes. The mixture was left to settle for 10 minutes with observations being taken: after sample addition; immediately after agitating and after allowing it to settle for 10 minutes. A slight haziness of the water phase due to a reverse emulsion is an acceptable final fluid condition. A heavy emulsion or pad (a pad is a non-collapsible emulsion or foam left between the two phases) constitute a failure. A blank sample is used as a benchmark. Results are given in Table VI.

KHI B passed all three of the secondary property tests.

TABLE VI

Emulsion Tendency Test Results

| Product | Dose (vol %) | Observations after 10 minutes |
| --- | --- | --- |
| KHI B | 1.5 | The emulsion separates (after 2 minutes) to leave a clear condensate layer. The aqueous layer remains hazy |

Example 5

Compatibility Tests in DI Water and Brine

The polymer has to be stable in water at room temperature, sea-bed temperature and elevated temperatures (usually the well-head injection temperature, which can vary from field to field). As application conditions may vary, a temperature of 90° C. was used as to represent a relatively high injection temperature.

100 ml of deionised water was added to a sample bottle and dosed with 1.5% of the polymer sample (or the percentage to be used in the hydrate inhibition test). On observing the appearance at room temperature, the bottle is heated to 90° C. for in a water bath, after 15 minutes final observations were taken. A 1.5 vol % dosage was used. Results are presented in Table VII. "CBL" refers to Clear Bright Liquid—this means the sample has not suffered detrimental precipitation or component "fall-out" after heating and is stable to the process; no haziness is apparent.

TABLE VII

DI Water Compatibility Test Results

| Polymer | Appearance at room temperature | Appearance at 70° C. |
| --- | --- | --- |
| KHI A | CBL | CBL |

Similar tests were repeated with a low salinity brine (10,000 TDS (total dissolved solids)) and a high salinity brine (180,400 TDS). Again, a 1.5 vol % dosage was used. The results are presented in Table VIII. It can be seen that KHI B passed all the water/brine compatibility tests.

TABLE VIII

Brine Compatibility Test Results

| Brine concentration (TDS) | Polymer reference | Appearance at room temperature | Appearance at 70° C. |
| --- | --- | --- | --- |
| 10,000 | KHI B | CBL | clear - no precipitate |
| 180,400 | KHI B | CBL | clear - no precipitate |

Example 6

KHI C—Terpolymer of Acryloylmorpholine, Vinylimidazole and Vinylcaprolactam

The synthesis of the KHI (terpolymer) was performed in a two piece glass reactor with 5 ports available for ancillary equipment including: overhead mechanical agitator, reflux condenser, dropping funnel, thermocouple and stopper. The empty vessel was placed on a tared balance and the reagents added by weight. The monomers: 4-acryloylmorpholine, (11.60%); N-vinylimidazole, (7.73%); 1-vinylcaprolactam (2.53%) methanol (52.76%) and 2-propanol (IPA)(16.92%) were added to the vessel and degassed for a period of five minutes before heating to 65° C. An aqueous solution of VAZO 56 WSW initiator (herein referred to as VAZO) was also degassed for five minutes or until the solid initiator was dissolved. The initiator solution comprised 0.50 g VAZO in 4.98 g water. A head of positive nitrogen pressure was maintained throughout the reaction to reduce any air ingress potentially capable of killing free radicals and preventing their propagation through the mixture.

When the monomer solution reached 65° C. the VAZO solution was added to the monomer solution in a single addition. If the reaction was on a scale larger than about 1 kg (total mass) the VAZO solution may be added in a stepwise fashion to control the exotherm produced. The reaction was allowed to proceed with mechanical agitation for 90 minutes or until the reaction was deemed complete by non-volatile residue analysis. The clear yellow solution was allowed to cool with stirring until ambient temperature was achieved.

The cooled mixture appeared slightly cloudy and was weighed to determine any weight loss due to solvent losses over the course of the reaction period. Any lost solvent was replaced with methanol (the component most likely to be lost) to maintain the original mass. Water (2-3 percent) was added to the cloudy mixture and stirred until the mixture became completely clear.

Current KHIs are obtained from suppliers and prepared by blending with specific solvents. Improved performances in secondary property and compatibility tests distinguish this terpolymer product from current KHI products.

The new polymer was compatible in high salinity brines at room temperature and at temperatures as high as 75° C., as determined by the tests described in Example 5. Current products showed worse performance in these tests. The KHI was added to a hydrate rocking cell (either sightless or with a viewing window) as a percentage of the water in the producing gas system being modeled. Condensate may also be added to mimic the modeled system. Finally, a synthetic or real (natural) gas mixture was added to the cell under pressure until the desired pressure was obtained to achieve the system's subcooling at the test temperature. The cell(s) were added to a water bath and the water temperature was lowered to achieve the desired subcooling (in combination with the pressure used) for the system to be effectively modeled. The pressures of the cells were monitored and recorded electronically. The terpolymer performed well in the hydrate test and passed.

The compositions and methods herein may be improved if the chemical or solvent balance is altered in favor of one chemical or another, or if additional monomers are included in the product. Alternate chain transfer agents or reaction solvents not tried above but within the scope of the methods and compositions herein may also have a positive effect on the outcome of the KHI's properties. The reaction time for the process could vary from as little as 1 minute to several hours and the addition of the initiator could take place over a shorter period (i.e. as a single and instant addition) or a longer period. Differences in reaction temperatures could be observed and the degassing process may or may not need to occur. The product could also be synthesized by other step or chain growth polymerization processes such as RAFT (reversible addition-fragmentation chain transfer), metathesis, anionic or cationic polymerizations.

Further, the bias of the chemicals within the KHI may be altered to improve or fine tune the desired properties of the polymers. These properties may be the primary KHI performance to inhibit the onset of gas hydrates or secondary properties such as emulsion or foaming tendencies, improved stability in hot injection tests, thermal stability, environmental impact, compatibility with other commonly used chemicals such as corrosion or other inhibitors. In addition, the composition may be altered to increase cost effectiveness or to fine tune to a particular application.

Many other modifications may be made in the compositions and methods of this invention without departing from the spirit and scope thereof that are defined only in the appended claims. For example, the exact copolymers and terpolymers may be different from those explicitly mentioned herein. Various combinations of gas hydrate inhibitors alone or together other than those described here are also expected to be useful. Further, LDHIs used alone or together with mixtures of water, hydrocarbons and hydrate-forming guest molecules different from those exemplified herein would be expected to be successful within the context of this invention.

The present invention may suitably comprise, consist or consist essentially of the elements disclosed and may be practiced in the absence of an element not disclosed. For instance, a method for inhibiting formation of hydrates may also consist essentially of or consist of contacting a fluid including water and hydrate-forming guest molecules that form hydrates at hydrate forming conditions, with an amount of a kinetic hydrate inhibitor (KHI) effective for inhibiting hydrate formation at the hydrate-forming conditions consisting essential of or consisting of a copolymer having monomers selected from the group consisting of acryloylmorpholine, vinylimidazole, vinylcaprolactam and combinations thereof. Also, a hydrate-inhibited fluid may also consist essentially of or consist of water, hydrate-forming guest molecules, and at least one kinetic hydrate inhibitor (KHI) in an amount effective to inhibit formation of hydrates at hydrate forming conditions, where the KHI consists essentially of or consists of a copolymer having monomers selected from the group consisting of acryloylmorpholine, vinylimidazole, vinylcaprolactam and combinations thereof. Additionally, a copolymer may consist essentially of or consist of monomers selected from the group consisting of acryloylmorpholine, vinylimidazole, vinylcaprolactam and combinations thereof. Further, a hydrocarbon well may consist essentially of or consist of an annular space and a fluid in the annular space, where the fluid is inhibited against hydrate formation in the presence of water at hydrate forming conditions, and the fluid consists essentially of or consists of water, hydrate-forming guest molecules and at least one kinetic hydrate inhibitor (KHI) in an amount effective to inhibit formation of hydrates at hydrate forming conditions, where the KHI consists essentially of or consists of a copolymer having monomers selected from the group consisting of acryloylmorpholine, vinylimidazole, vinylcaprolactam and combinations thereof.

The words "comprising" and "comprises" as used throughout the claims is to interpreted "including but not limited to".

What is claimed is:

1. A hydrate-inhibited fluid comprising:
   water;
   hydrate-forming guest molecules; and
   at least one kinetic hydrate inhibitor (KHI) in an amount effective to inhibit formation of hydrates at hydrate forming conditions, where the KHI comprises a terpolymer comprising monomers selected from the group consisting of acryloylmorpholine, vinylimidazole, vinylcaprolactam, n-vinyl pyrrolidone and combinations thereof.

2. The hydrate-inhibited fluid of claim 1 where the terpolymer is a terpolymer of acryloylmorpholine, vinylimidazole and vinylcaprolactam.

3. The hydrate-inhibited fluid of claim 2 where in:
   the case of the terpolymer of acryloylmorpholine, vinylimidazole and vinylcaprolactam, the molar ratio of acryloylmorpholine to vinylimidazole to vinylcaprolactam ranges from about 1:1:98 to about 1:98:1 to about 98:1:1.

4. The hydrate-inhibited fluid of claim 1 where the amount of the KHI in the fluid ranges from about 1 to about 15 vol % based on the water in the fluid.

5. A terpolymer comprising monomers selected from the group consisting of acryloylmorpholine, vinylimidazole, vinylcaprolactam, n-vinyl pyrrolidone and combinations thereof.

6. The terpolymer of claim 5 where the terpolymer is a terpolymer of acryloylmorpholine, vinylimidazole and vinylcaprolactam.

7. The copolymer of claim 6 where in:
   the case of the terpolymer of acryloylmorpholine, vinylimidazole and vinylcaprolactam, the molar ratio of acryloylmorpholine to vinylimidazole to vinylcaprolactam ranges from about 1:1:98 to about 1:98:1 to about 98:1:1.

* * * * *